UNITED STATES PATENT OFFICE.

DANIEL M. MARSHALL, OF COLUMBIA CITY, INDIANA.

IMPROVEMENT IN INDELIBLE INKS.

Specification forming part of Letters Patent No. 174,917, dated March 21, 1876; application filed January 22, 1876.

*To all whom it may concern:*

Be it known that I, DANIEL M. MARSHALL, of Columbia City, in the county of Whitley and State of Indiana, have invented a new and useful Indelible Ink, which is fully described in the following specification.

This invention relates to that class of inks used to cancel stamps of all kinds and descriptions, so as to render them unfit for reuse; and it consists in a composition formed by mixing ordinary printer's ink with carbolic acid.

To prepare my ink take, say, one pound of printer's ink, provided the quality be good, and add thereto one ounce of dilute carbolic acid and mix them thoroughly.

The ink thus prepared is rendered beyond the power of chemicals to remove it without destroying the stamps or injuring them so decidedly that they cannot be reused under any circumstances. I am aware that it is common to add carbolic acid to fluid inks to preserve them; but this is not my invention.

What I claim, and desire to secure by Letters Patent, is—

An indelible ink for canceling postage-stamps, consisting of ordinary printer's ink and carbolic acid, substantially as described.

DANIEL M. MARSHALL.

Witnesses:
ELI W. BROWN,
H. H. HEYER.